United States Patent
Caserta

(10) Patent No.: US 10,698,626 B2
(45) Date of Patent: Jun. 30, 2020

(54) METHOD OF MANAGING INTEGRATED CIRCUIT CARDS, CORRESPONDING CARD AND APPARATUS

(71) Applicant: STMicroelectronics S.r.l., Agrate Brianza (IT)

(72) Inventor: Francesco Caserta, Naples (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 14 days.

(21) Appl. No.: 15/986,392

(22) Filed: May 22, 2018

(65) Prior Publication Data

US 2018/0341420 A1 Nov. 29, 2018

(30) Foreign Application Priority Data

May 26, 2017 (IT) .......................... 102017000057287

(51) Int. Cl.
*G06F 3/06* (2006.01)
*H04W 4/60* (2018.01)
(Continued)

(52) U.S. Cl.
CPC ............ *G06F 3/0644* (2013.01); *G06F 3/064* (2013.01); *G06F 3/0604* (2013.01);
(Continued)

(58) Field of Classification Search
CPC ........... G06F 3/06–0644; G06F 3/0644; G06F 3/0602–0604; G06F 3/0688; G06F 3/064; H04W 4/60; H04W 8/183
See application file for complete search history.

(56) References Cited

U.S. PATENT DOCUMENTS 5,109,485 A * 4/1992 Smith, Jr. ............. G06F 3/0601
709/213
5,404,485 A * 4/1995 Ban ....................... G06F 3/0601
711/202

(Continued)

FOREIGN PATENT DOCUMENTS

EP 3099045 A1 11/2016
WO 9420906 A1 9/1994

OTHER PUBLICATIONS

Yosi Ben Asher, Nadav Rotem, Automatic Memory Partitioning: Increasing Memory parallelism via Data Structure Partitioning, Oct. 24, 2010, IEEE/ACM/IFIP International Conference on Hardware/Software Codesign and System Synthesis (CODES+ISSS) (Year: 2010).*

(Continued)

*Primary Examiner* — Khoa D Doan
(74) *Attorney, Agent, or Firm* — Slater Matsil, LLP

(57) ABSTRACT

An integrated circuit card with a memory space includes memory space locations for storing user profile data of a plurality of user profiles. The memory space can be partitioned in segments of memory space locations. A segment map includes segment map memory locations with the memory space locations in the memory space coupled to respective segment map memory locations in the segment map. The memory space locations in the memory space can be allocated to the user profile data by recording in the respective segment map memory locations in the segment map the profile in the plurality of user profiles to which the memory space locations in the memory space are reserved.

23 Claims, 4 Drawing Sheets

(51) Int. Cl.
*H04W 12/00* (2009.01)
*H04W 8/18* (2009.01)

(52) U.S. Cl.
CPC .......... *G06F 3/0652* (2013.01); *G06F 3/0659* (2013.01); *G06F 3/0679* (2013.01); *H04W 4/60* (2018.02); *H04W 8/183* (2013.01); *H04W 12/00* (2013.01)

(56) References Cited

U.S. PATENT DOCUMENTS

| | | | | |
|---|---|---|---|---|
| 5,991,858 | A * | 11/1999 | Weinlander | G06F 12/1441 711/163 |
| 6,446,034 | B1 * | 9/2002 | Egolf | G06F 9/45554 703/27 |
| 7,085,879 | B2 * | 8/2006 | Aasheim | G06F 12/0246 707/999.103 |
| 7,392,236 | B2 * | 6/2008 | Rusch | G06F 16/252 |
| 7,636,367 | B1 * | 12/2009 | Wang | H04L 47/10 370/412 |
| 8,588,749 | B1 * | 11/2013 | Sadhvani | H04M 1/24 379/1.01 |
| 9,820,139 | B1 * | 11/2017 | Veneroso | H04B 1/3816 |
| 10,025,673 | B1 * | 7/2018 | Maccanti | G06F 11/1458 |
| 10,048,865 | B2 * | 8/2018 | Mehra | G06F 3/0631 |
| 10,365,858 | B2 * | 7/2019 | Miller | G06F 12/1009 |
| 2002/0032691 | A1 * | 3/2002 | Rabii | G06F 16/10 |
| 2003/0023826 | A1 * | 1/2003 | McMichael | G06F 3/0601 711/173 |
| 2003/0135709 | A1 * | 7/2003 | Niles | G06F 3/0608 711/220 |
| 2004/0186955 | A1 * | 9/2004 | Takahashi | G06F 13/385 711/115 |
| 2004/0196723 | A1 * | 10/2004 | Eilert | G11C 8/12 365/230.03 |
| 2005/0080985 | A1 * | 4/2005 | Sasaki | G06F 3/0607 711/103 |
| 2005/0144402 | A1 * | 6/2005 | Beverly | G06F 12/1475 711/152 |
| 2005/0226072 | A1 * | 10/2005 | Nakabe | G06F 21/6209 365/222 |
| 2006/0047889 | A1 * | 3/2006 | Sasaki | G06F 12/0246 711/103 |
| 2007/0174545 | A1 * | 7/2007 | Okada | G06F 3/0605 711/112 |
| 2010/0037009 | A1 * | 2/2010 | Yano | G06F 12/0246 711/103 |
| 2010/0131561 | A1 * | 5/2010 | Lin | G11B 27/329 707/791 |
| 2010/0185874 | A1 * | 7/2010 | Robles | G06F 21/6218 713/189 |
| 2010/0323664 | A1 * | 12/2010 | Sivaram | H04M 1/66 455/411 |
| 2011/0078391 | A1 * | 3/2011 | Ootani | G06F 3/0613 711/154 |
| 2012/0157047 | A1 * | 6/2012 | Chen | H04L 63/08 455/411 |
| 2012/0166757 | A1 * | 6/2012 | Volvovski | G06F 11/1076 711/206 |
| 2012/0233404 | A1 * | 9/2012 | Benhase | G06F 3/065 711/117 |
| 2012/0254565 | A1 * | 10/2012 | Mitra | G06F 16/113 711/161 |
| 2013/0283047 | A1 * | 10/2013 | Merrien | H04W 12/08 713/164 |
| 2013/0339589 | A1 * | 12/2013 | Qawami | G06F 9/30101 711/103 |
| 2013/0344864 | A1 * | 12/2013 | Park | H04W 8/18 455/432.3 |
| 2014/0031012 | A1 * | 1/2014 | Park | H04W 12/06 455/411 |
| 2014/0045460 | A1 * | 2/2014 | Park | H04W 8/205 455/411 |
| 2014/0220952 | A1 * | 8/2014 | Holtmanns | H04W 8/183 455/418 |
| 2014/0308991 | A1 * | 10/2014 | Lee | H04W 8/183 455/558 |
| 2015/0019830 | A1 * | 1/2015 | Park | G06F 3/0659 711/165 |
| 2015/0281957 | A1 * | 10/2015 | Hartel | H04M 1/675 455/411 |
| 2016/0041906 | A1 * | 2/2016 | Mukherjee | G06F 16/221 711/119 |
| 2016/0092121 | A1 * | 3/2016 | Nazari | G06F 3/0616 711/103 |
| 2016/0156607 | A1 * | 6/2016 | Kim | H04L 63/08 726/7 |
| 2016/0353274 | A1 * | 12/2016 | Chichierchia | H04B 1/3816 |
| 2017/0060450 | A1 * | 3/2017 | Roberts | G06F 3/0619 |
| 2017/0280321 | A1 * | 9/2017 | Caceres | H04W 4/50 |
| 2018/0027407 | A1 * | 1/2018 | Veneroso | H04B 1/3816 455/418 |
| 2018/0113816 | A1 * | 4/2018 | Hellwig | G06F 12/14 |
| 2018/0275873 | A1 * | 9/2018 | Frid | G06F 3/061 |

OTHER PUBLICATIONS

R. Viti, L. Brilli, T. Pecorella and R. Fantacci, "User initiated fast identity switch between LTE UEs," 2015 AEIT International Annual Conference (AEIT), Naples, 2015, pp. 1-6. (Year: 2015).*

Eran Gal, et al., "Algorithms and Data Structures for Flash Memories", ACM Computing Surveys, vol. 37, No. 2, Jun. 2005, pp. 138-163.

* cited by examiner

METHOD OF MANAGING INTEGRATED CIRCUIT CARDS, CORRESPONDING CARD AND APPARATUS

CROSS-REFERENCE TO RELATED APPLICATIONS

This application claims priority to Italian Application No. 102017000057287, filed on May 26, 2017, which application is hereby incorporated herein by reference.

TECHNICAL FIELD

The description relates to integrated circuit cards.

BACKGROUND

Mobile communication equipment in, e.g., GSM and UMTS networks may employ smart cards of the type currently referred to as Universal Integrated Circuit Card (UICC).

A UICC may use a SIM application to access the GSM network and a USIM application to access a UMTS network. A UICC may contain several applications, making it possible for a same smart card to give access to several networks by also providing facilities to the users.

An operator may specify a set of applets, security domains and files that the smart card issuer stores in the smart card. This set of information is currently referred to as "profile".

A recent development of UICC's is represented by embedded UICC (eUICC's) which may be incorporated, e.g., in a mobile terminal, thus enabling a user to change operator (and so its profile) over the air by means of a software procedure. An eUICC is also capable of managing multiple mobile network operator subscriptions, by making it possible for a user to enable/disable a current profile on the fly.

UICC's and eUICC's may reside in a non-volatile memory (e.g., flash-based) used to store a profile.

As discussed previously, a profile may include:

a hierarchy of security domains, that is specific applications which can be regarded as authentication entities (key containers) by means of which an operator can modify a profile over the air;

a set of applets, that is applications capable of authenticating to a specific network (e.g., UMTS) or interact with the user; these applets may be written by means of a Java Card technology and may include many Java Card objects;

a hierarchy of directories and files, which contain personalization information for the applets as well as data useful for authentication purposes.

Profile entities such as security domains, applets, files may include a set of objects to be stored and handled by the operating system of the related apparatus.

Security domains and applets may include Java Card objects and code. These and other type of persistent entities (such as files and directory), are indivisible and stored in memory. They can be, without prejudice to the underlying principles, called "blocks".

Each block stored in a non-volatile memory in an UICC may pertain to a single profile installed in the card. In a multi-profile UICC, the operating system will keep a correspondence between each block and its associated profile.

SUMMARY

One or more embodiments may be applied, e.g., to Universal Integrated Circuit Cards (UICC's) for use, e.g., in mobile communication equipment.

One or more embodiments contribute in dealing with a number of issues that are recognized to exist in a context as discussed in the foregoing.

For instance, profiles in an eUICC can be downloaded and deleted over the air. Only one profile at a time is "enabled" that is currently used; however several different profiles can be stored on a same eUICC and the capability for a user to switch the enabled profile at any time represents a desirable feature.

Also, fast downloading and deletion of profiles is a feature regarded as desirable by operators, with erase/write operations in a non-volatile memory likely to represent a sort of bottleneck in both profile download and in profile deletion; reducing the number of memory operations involved may thus facilitate good performance.

The deletion operation may turn out to be critical in so far as several profiles may be desired to be deleted at once by means of a (single) reset operation. Also, operations made once a profile is enabled (e.g., applet loading, applet deletion and so on), should not affect the other profiles in the card. More to the point, write/erase operations in a profile having no impact on the other profiles is a (highly) desirable feature.

Finally, a specific persistent memory management strategy adopted by the operating system in order to properly operate a multi-profile UICC is a desirable feature under various respects such as keeping track of which profile holds a certain block, facilitating profile isolation, and facilitating good performance both in profile download and in profile deletion.

According to one or more embodiments that object may be achieved by means of a method of managing an integrated circuit card (e.g., an UICC or an eUICC) having the features set forth in the claims that follow.

One or more embodiments may relate to a corresponding integrated circuit card and to corresponding apparatus, e.g., equipment for mobile communications.

The claims are an integral part of the technical disclosure of the embodiments as provided herein.

One or more embodiments may provide one or more of the following advantages:

delete profile and profile loading procedures become easier and faster;

with a delete profile procedure performed by means of an erase, a subsequent profile loading will operate on a free memory as erased with the profile loading procedure becoming faster (e.g., in flash memories where write operations involve a preliminary erase operation);

entities such as a segments may be aligned at least to the page size so that isolating profiles is facilitated;

an error during the write/erase operation in a profile will be highly unlikely to corrupt another profile;

cost in terms of space lost is negligible and decreases with the segment size; the possibility also exists of adopting a "minimum segment map writes" procedure to reduce fragmentation in the memory;

the possibility exists of effectively dealing with a situation likely to occur in an eUICC environment, namely allocations tending to occur in bursts (for instance after profile loading, during profile life, with many objects allocated at a same time), with good fitting with memory manager procedures being facilitated.

BRIEF DESCRIPTION OF THE DRAWINGS

One or more embodiments will now be described, by way of example only, with reference to the annexed FIGS., wherein.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Figure 8:
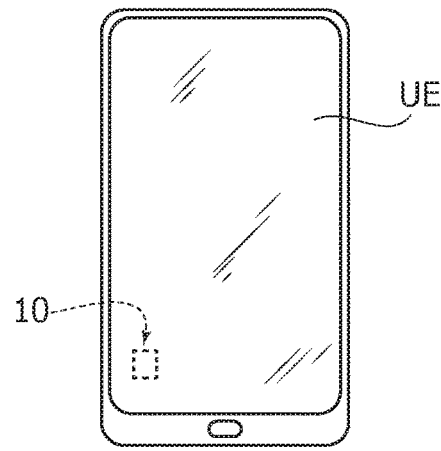
FIG. 8 is exemplary of a possible application of embodiments to mobile communication equipment.

FIG. 8 is exemplary of the possibility of using an integrated circuit card (UICC or eUICC) in apparatus such as a mobile communication equipment UE. A mobile terminal (User Equipment) such as a mobile phone or a tablet may be exemplary of such apparatus.

In one or more embodiments, the integrated circuit card functionality may be included in a so-called SIM-on-Chip, adapted to be incorporated (e.g., soldered by resorting to surface mount technology—SMT) in apparatus as exemplified in FIG. 8. By way of reference (and without any limiting intent of the embodiments) such a SIM-on-Chip may have dimensions of 5 mm×6 mm in comparison with dimensions such as 15 mm×25 mm for a standard SIM card.

In the following detailed description various technical terms will be used to which the following definitions apply.

Persistent heap: this is a part of persistent memory which can be used by an operator to store applications, security domains and files and may include a list of empty an allocated regions.

Block: this is an indivisible amount of stored data that contains a Java Card object or a file. Given a block reference B, that is an identifier of the block, the operating system of apparatus such as UE may determine its address B.addr and size B.size. For example, the operating system may hold a data structure called allocation block table that keeps a correspondence between block references and their address/size.

Allocated region: this is a memory area where a set of adjacent blocks are allocated. Given an allocated region A, the operating system is able to determine its size A.size, for example as the sum of the sizes of the blocks included in the region.

Empty region: this is a memory area which is free, that is a memory area where no blocks are allocated (even partially). Given an empty region E, the operating system is able to determine its size E.size, in order to keep trace of the available space. The operating system can, for instance, maintain a list of empty regions.

In the following it will be assumed that an allocated region is always preceded by an empty region or the beginning of a heap while also assuming that it is followed by an empty region or the end of a heap.

Consistently, an empty region will be preceded by an allocated region or the beginning of the heap and will be followed by an allocated region or the end of the heap.

Figure 1:
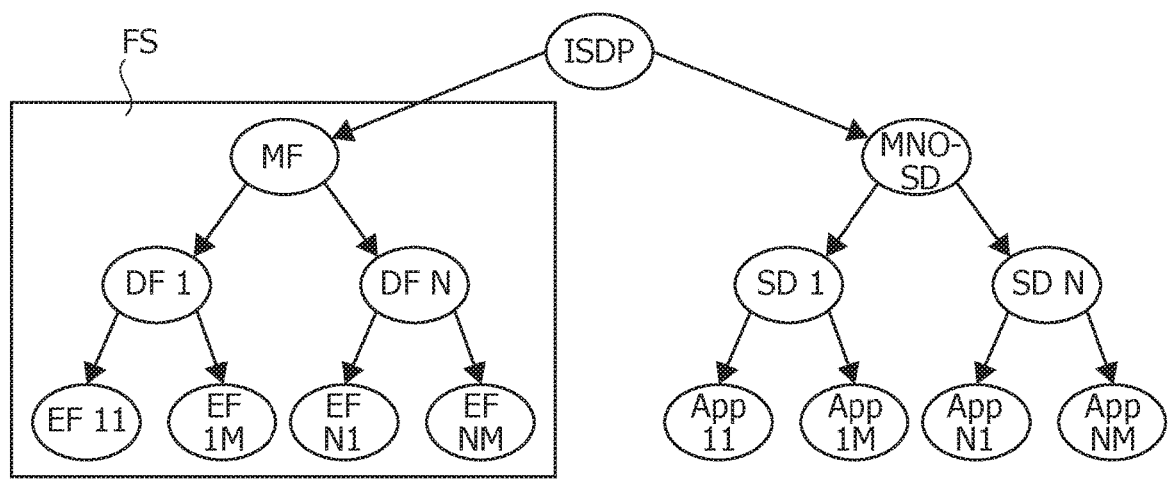
FIGS. 1 to 3 are schematic representations of arrangements dealing with various issues likely to arise in integrated circuit card management.
Figure 2:
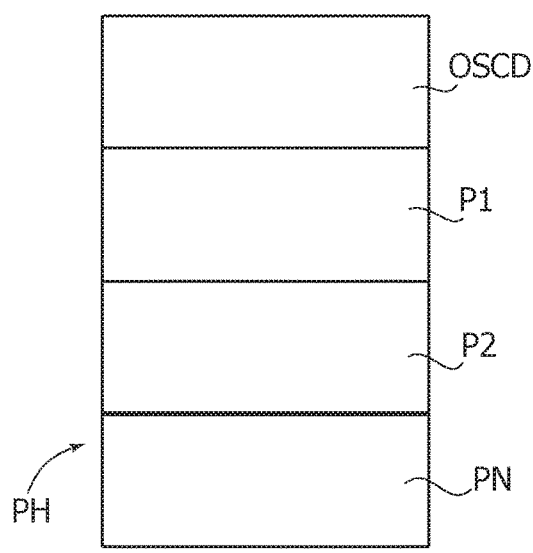
Figure 3:
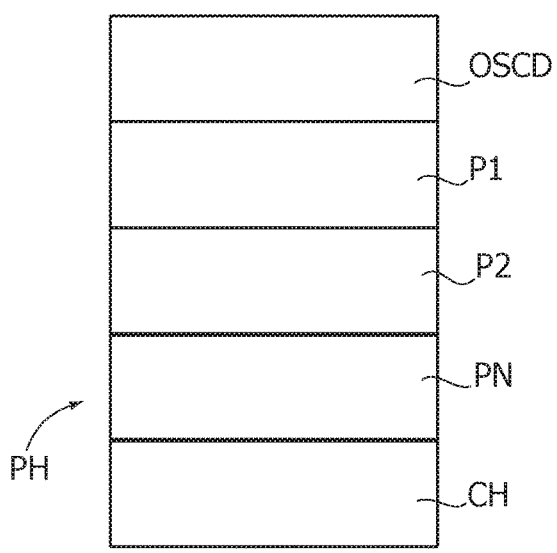

FIGS. 1 to 3 are exemplary of a number of ways of dealing with certain ones of the issues discussed in the introductory portion of the description.

For instance, FIG. 1 is exemplary of a way of keeping track of the correspondence between blocks and profiles based on a tree relationship between files MF, DF, EF in a file system FS and the applets (App)/security domains (SD) and their components.

The SGP.02 and SGP.22 GSMA specifications (related to the so-called eUICC Industrial and Consumer) define a particular kind of security domain, called ISD-P which can be regarded as a sort of "container" of an entire profile.

As schematically represented in FIG. 1, starting from an ISD-P the possibility exists of obtaining a reference to each applet/security domain/file in a profile.

Starting from each applet/security domain/file it is similarly possible to obtain a reference to each block included therein. Data structures making this association possible are related (e.g., proprietary) of a specific operating system.

The performance level of such an approach was observed to be very poor. In fact, the delete profile procedure is inevitably slow in so far as looping through the tree is time-consuming. Also, once a block to be deleted is found, a block deletion almost inevitably involves transactions in so far as adjacent blocks may pertain to other profiles. The profile loading procedure is similarly slow. Again, block write is done transactionally in so far as adjacent blocks pertaining to another profile may be present.

Additionally, profile isolation is not guaranteed. Erase/write operations, even other than profile loading/deletion, are again done transactionally in order to avoid affecting blocks of other profiles. A bug in the transaction mechanism will almost inevitably produce errors in several profiles at once.

Finally, the memory management strategy will be inevitably bound to flash memory page granularity. Typically, in flash memories, page size is 256 or 512 bytes, and erase always occurs in pages. On the other hand, a write operation usually has a much lower granularity (1 to 4 bytes), but requires the memory involved to be in the erased state. Thus an update operation of even a single byte often involves an erase operation on its page. For these reasons, an update/erase of a block in a memory page affects blocks in the same pages.

Another possible approach in managing UICC's is exemplified in FIG. 2, where OSCD denotes Operating System Code and Data; P1, P2, . . . , PN denote corresponding profiles; and PH denotes a persistent heap.

Essentially, the solution of FIG. 2 involves splitting the persistent heap in equal or different parts, e.g., multiples of a page. Such an approach may facilitate memory isolation of the profiles with deletion becoming simply the erase of the memory area of a profile, thus being (very) fast while profile loading may be also (very) fast since write operations are not transactional by necessity.

A drawback of the approach exemplified in FIG. 2 was observed to lie in the various profiles failing to have the same size. In fact, the size of a profile is unpredictable even at the beginning of profile download. Moreover, the operator may decide to load more applets/security domains/files over the air. If a large profile size is selected, then a significant amount of space may go undesirably wasted in case a small profile is allocated. Conversely, if a small profile size is selected, loading a large profile may become impossible with profile loading in that case resulting in an error during download.

FIG. 3 is exemplary of a hybrid approach wherein memory area can be divided again in parts (OSCD, P1, P2, . . . PN) as discussed previously in connection with FIG. 2, with an additional common heap (CH) which is shared between the profiles.

An issue in that approach is represented by tracking the correspondence between the objects in the common heap CH and the profiles, that is, identifying the profile to which a certain object belongs.

Another approach could involve resorting to a memory management unit—MMU—to break the requirement of indivisibility of the blocks. This is however a fairly uncommon feature to be installed in a smart card such as a UICC. While certain software libraries can simulate a memory management unit, their use is fairly invasive and may a result in memory accesses being slowed down.

Figure 4:
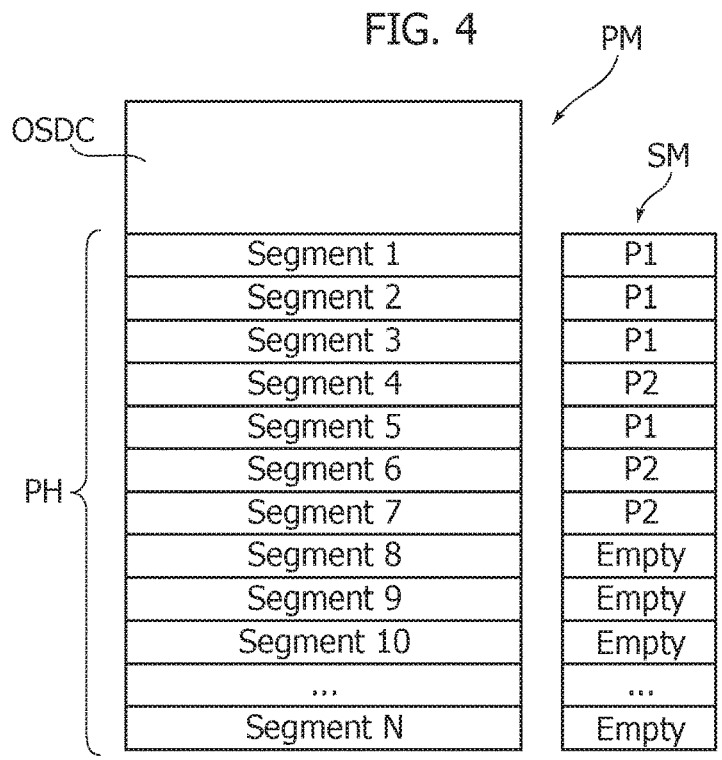
FIG. 4 is a representation of a principle underlying embodiments.

In one or more embodiments as exemplified in FIG. 4 an integrated circuit card such as an UICC or eUICC can be arranged to include a persistent memory heap PH with an associated segment map SM.

An arrangement as exemplified in FIG. 4 may provide for the persistent heap PH to be (logically) divided in small segments (e.g., Segment 1, Segment 2, . . . , Segment N) having a size which is an (integer) multiple of a flash page (e.g., 4096 bytes).

The segment map structure SM may be similarly allocated in the persistent memory PM e.g., in the operating system and code OSCD area. The corresponding data structure may reserve a byte for each segment in the persistent heap PH in order to indicate the profile for which a segment is reserved.

In one or more embodiments, if a segment is reserved for a i-th profile (only) blocks owned by the i-th profile can be stored in the memory area of the segment.

In one or more embodiments, once a block is allocated in a segment i, its profile ID can be written in the i-th byte of the segment map SM. That segment may thus remain reserved to the profile until (all) the blocks in the segment are deleted. When this occurs the profile ID in the i-th byte of the Segment Map can be erased, meaning that the segment is again free.

Figure 5:
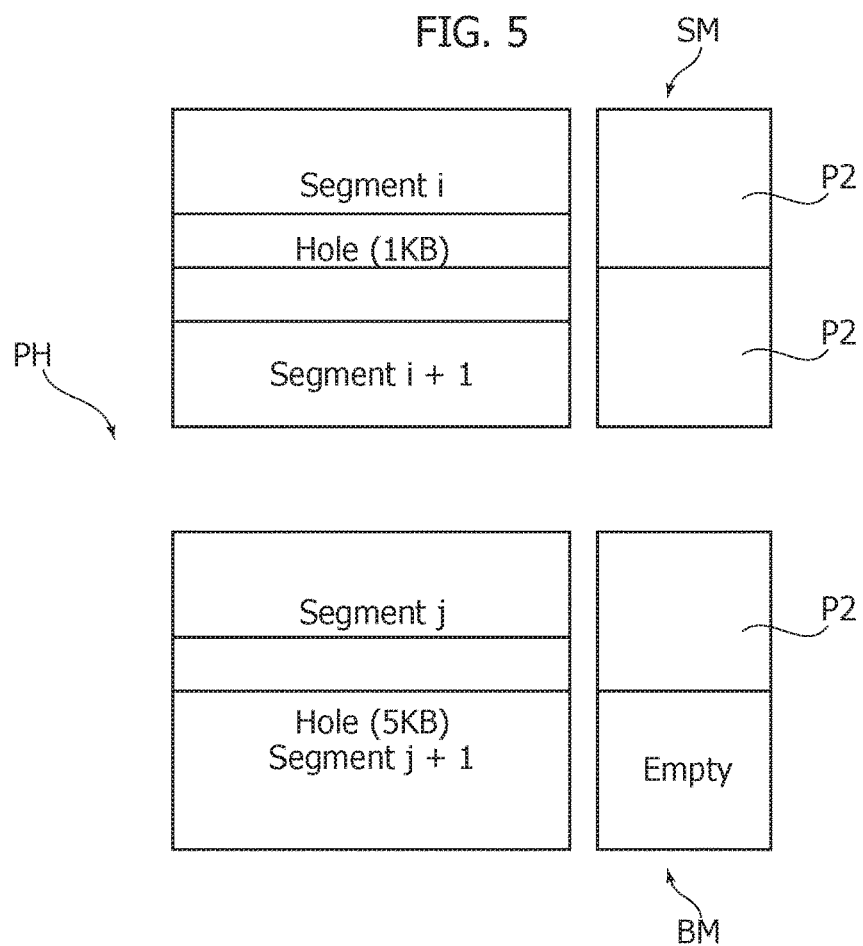
FIG. 5 is a diagram further developing on the concept outlined in FIG. 4, FIGS. 6 and 7 are flow-charts exemplary of embodiments.

As schematically represented in FIG. 5, in one or more embodiments a block "owned" by the i-profile can be allocated (only) in a segment or in a set of adjacent segments that are either reserved to the i-th profile or empty.

In one or more embodiments, each time an object is allocated, a position can be chosen in order to facilitate reducing the number of segment map writes (e.g., by having minimum number of segment map writes as a target).

This facilitates increasing the number of free segments (e.g., by facilitating having a maximum number of free segments). Free segments can be used for future allocations by (all) the profiles for which a new object is allocated.

In that respect, FIG. 5 exemplifies a possible snapshot of the persistent heap. An empty partition of, e.g., 1 KB is available between segment i and segment i+1 (upper portion of FIG. 5) and another empty partition of, e.g., 5 KB is available after segment j with a segment j+1 empty (lower portion of FIG. 5).

Of course, the values given above are merely exemplary and not intended to be limiting of embodiments.

The right-hand side of FIG. 5 exemplifies a possible arrangement for the segment map SM in respectively in the locations [i, i+1] and [j, j+1].

For instance, one may assume (merely by way of exemplary explanation) that the need arises of allocating a block of 800 bytes (this value is again merely exemplary and not intended to be limiting of embodiments) belonging to profile P2.

In that exemplary case, of the two empty partitions presented in FIG. 5 the first one (upper portion of FIG. 5) may represent a more attractive solution in so far as it does not produce writes to the segment map SM, while the second solution would imply a write in the (j+1)-th index of the segment map. This means that the number of un-allocated segments may remain unaltered and that after the last allocation the same amount of free space may remain available for future request by other profiles.

Profile deletion becomes simple and efficient when resorting to an arrangement as exemplified in FIGS. 4 and 5.

By analyzing the segment map SM the possibility will exist (e.g., for the operating system) to find out which memory areas are reserved to a given profile. Once these memory areas are determined, a set of erase operations can be used to safely erase the profile.

The addresses in the memory areas (if needed) can also be used to clean up data structures and pointers to particular objects of the profile stored in the operating system and memory area.

Profile loading is similarly safe and efficient. A block can be (always) allocated adjacent to other blocks of the same profile so that no transaction mechanism is involved during profile download.

Profile memory isolation is similarly facilitated. For instance, the segments as exemplified in FIG. 4 may have a size multiple of a flash page, so that write/erase operation on a profile will not affect other profiles.

Figure 6:
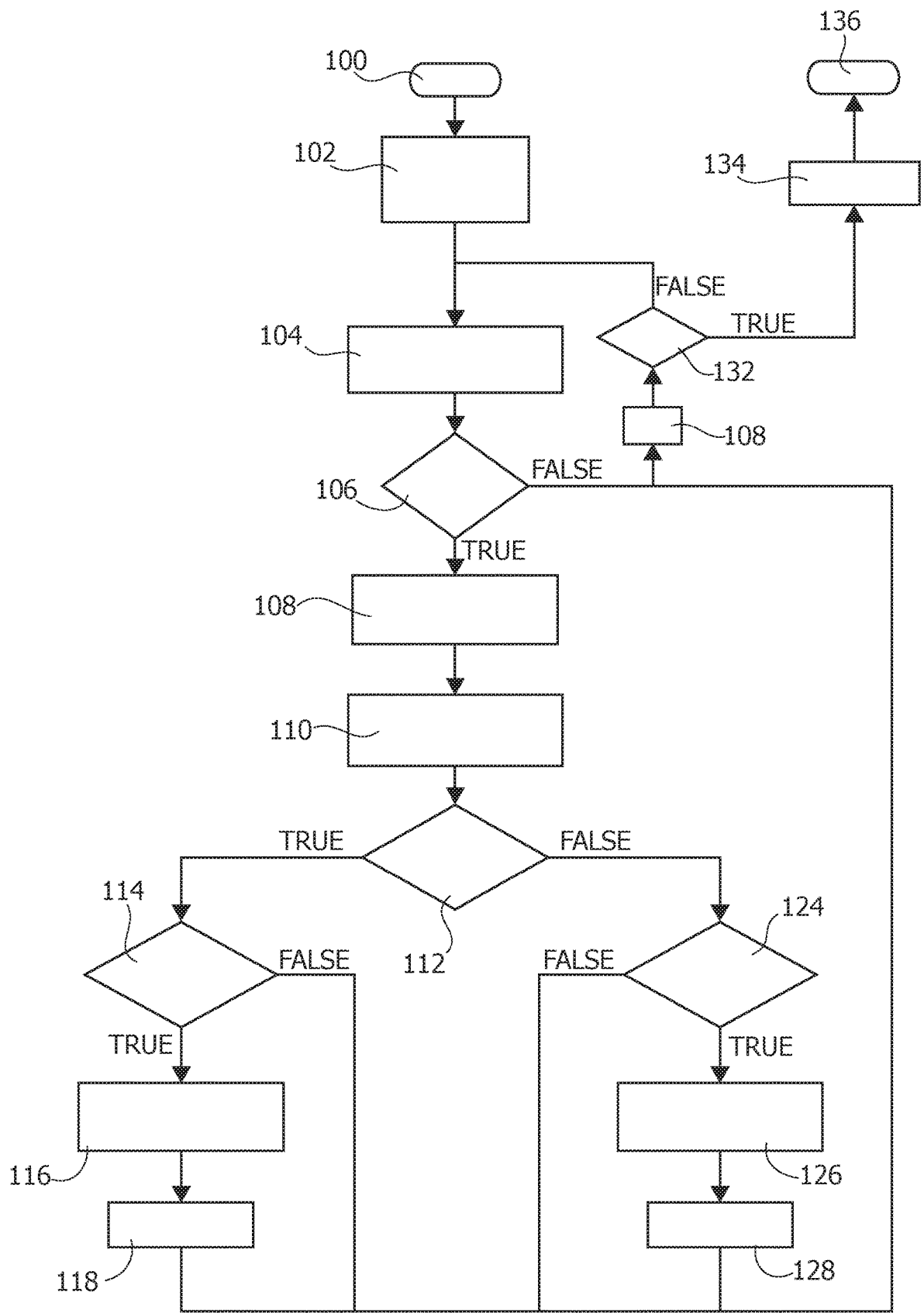

The flow-chart of FIG. 6 is exemplary of an allocation procedure which may be executed in order to allocate a new block.

Input to the procedure exemplified in FIG. 6 may include the following:
 E: a list of empty regions;
 SM: a segment map array (e.g., having all entries to, say, 0xFF),
 segmentSize: the size of a segment;
 heapBase: the address where the heap begins;
 B: a block to be allocated;
 profileId: a, e.g., one byte identifier of the profile holding the block.

The procedure exemplified in the flow-chart of FIG. 1 aims at finding the address "position" where the block B can be allocated or NULL in case the allocation is not possible e.g., because there is not enough persistent space in the persistent heap allocatable for profileId, or the execution of a defragmentation procedure is advisable.

The position address may be included in one of the empty partitions e.g., a position that reduces the number of writes in the segment map SM may be chosen. This may be facilitated by looping through the empty partition list E and by analyzing, for each partition, whether the block B is allocatable in such a partition (i.e. there is enough space in the partition allocatable for profileId) and calculating a lowest number of writes in the segment map SM which may facilitate allocating the block B in such partition. In case this number of writes is currently the lowest one, the latter will be written in bestSegmentSize, and the current "best" allocation position will be written in position.

After a start step 100, in a step 102 a number of parameters are initialized (e.g., i=0, bestSegmentCount=INF and position=NULL).

As exemplified in FIG. 6, i is a counter used to loop through the empty partition list E; position is the current best allocation position and bestSegmentCount is the number of writes in the segment map SM that would facilitate allocating the block B at position.

Various steps as identified by blocks 104, 106, 108 and 132 may lead the procedure to loop through the empty partition list E.

For instance, in a step 104 the maximum size of a block belonging to profileId allocatable in the empty partition E[i] may be assigned to maxSize.

In a step 106 a check is made as to whether the value maxSize assigned is higher or equal than the block size.

In the case step 106 yields a FALSE outcome (this meaning that the block B is not allocatable in the empty partition E[i]), the value of i is incremented in the step 108 to check the next partition E[i+1], unless all partitions have been already analyzed, i.e. with i reaching a maximum value E.size in step 132 discussed in the following.

In the case step 106 yields a TRUE outcome (this meaning that the block B is allocatable in the empty partition E[i]), in a step 108 the number of writes in the segment map SM which may possibly facilitate allocating the block in the initial part of E[i] (i.e. starting from the first address available for profileId in E[i]) is calculated and assigned to a parameter minSegmentUp.

In a step 110, the number of writes in the segment map SM which may possibly facilitate allocating the block B in the final part of E[i] (e.g., in the last B.size bytes of E[i] available for an allocation of a profileId block) is calculated and assigned to a parameter minSegmentDown.

In a step 112 a check is made as to whether minSegmentUp is lower than minSegmentDown.

If the check 112 yields a TRUE outcome (which means that allocating the block B in the first part of E[i] is a more convenient option), in a step 114 a check is made as to whether minSegmentUp is the lower number of segments writes calculated during the procedure execution, i.e. that minSegmentUp is lower than bestSegmentCount.

If the step 114 yields a TRUE outcome (which means that allocating the block in the first part of E[i] is the most convenient solution so far) the position address may be updated. For instance, in a step 116 the lowest address in E[i] that is part of an empty segment or a segment allocated to a profileId is assigned to "x" after which position is set to x in a step 118.

A substantially similar processing is performed in a sequence of steps 124, 126 and 128 in case step 112 yields a FALSE outcome, that is allocating the block in the final part of E[i] it is a more convenient option.

In this case, in the sequence of steps 124, 126 and 128 minSegmentDown is used in the place of a minSegmentUp with assignment to "x" made to the highest (and not the lowest) address in E[i] that is part of an empty segment or a segment allocated to profileId with position set to (x−block.size) in step 128.

In case steps 114 and 124 yield a FALSE outcome (which means that allocating the block in the current partition E[i] is not the most convenient solution e.g., the one that reduces the number of writes in SM, analyzed so far by the procedure) processing evolves to the step 108 where the parameter i is increased by one unit (e.g., i=i+1), i.e. the next empty partition is analyzed until the end of the empty partition list is reached. The step 108 is also reached after steps 118 and 128, that is when the current empty partition is the partition that reduces the number of writes in SM, with other partitions in the empty partition list still to be evaluated.

Finally, when all the empty partitions have been analyzed, i.e. when i reaches E.size in step 132, position is returned to the operating system in a step 134, and the procedure ends at 136. In case this address is different from NULL, an allocation of block in position will lead to the minimum write number in the segment map SM, i.e. bestSegmentCount writes in SM.

Figure 7:
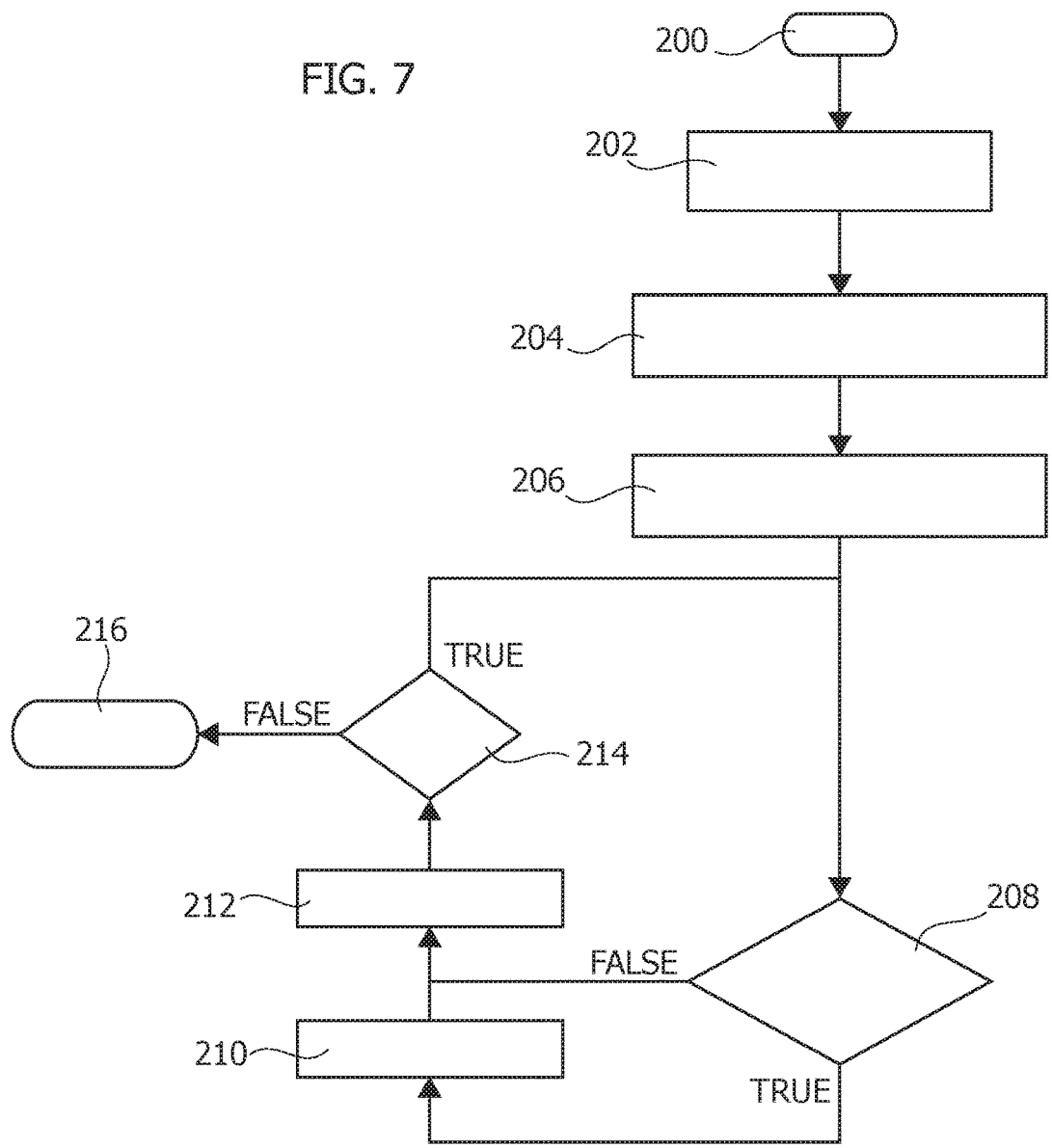

The flow-chart of FIG. 7 is exemplary of a possible de-allocation procedure in one or more embodiments.

Input to the procedure exemplified in FIG. 7 may be as follows:

B: block to be deleted having an address B.addr and a size B.size;
SM: segment map array;
segmentSize: the size of a segment;
E: list of empty regions;
BAT: Block Allocation Table.

When a block is requested to be deleted, various steps may facilitate keeping the memory consistent with operation of one or more embodiments. For instance, at each deletion, each segment where the block is even partially allocated is checked in order to establish whether the current deletion has freed the segment. In the latter case, the correspondent index in the segment map is freed, while other operating system dependent data structured such as the list of empty regions and the block allocation table will also be updated too.

As exemplified in FIG. 7, after a start step 200, a step 202 will be indicative of block B being requested to be cleared from the Block Allocation Table, this resulting in an indication BAT[B]<−NULL_BLOCK.

The block allocation table, or any operating system proprietary alternative, keeps a correspondence between a block identifier (e.g., Java Card reference) and the physical address where the block is stored. Since the block is expected to be deleted, this correspondence may be deleted too.

In a step 204 the segment number of B.addr is calculated and assigned to i while in a step 206 the segment number of (B.addr+B.size) is calculated and assigned to j). [i, j] is the interval of adjacent segments in which the block is (even partially) stored. This interval can be as small as one segment, in case i and j are equal.

The steps 208, 210, 212, 214 may lead to the procedure looping though the segments from i to j, and verifying for each segment whether the block B was the only block in the segment (step 208).

If so (outcome from step 208 true), in a step 210, the correspondent entry in the segment map is cleared.

Independently of the outcome of the step 208, the value of i is incremented by one in step 212, so that in the next iteration of the algorithm the next segment will be considered.

The loop continues until j+1 is reached (step 214, FALSE outcome) and the deallocation procedure ends at 216.

A method according to one or more embodiments may include providing an integrated circuit card (e.g., 10) with a memory space (e.g., PH) including memory space locations for storing user profile data of a plurality of user profiles (e.g., P1, P2, . . . , PN). The memory space is partitioned in segments (e.g., Segment 1, . . . , Segment N) of memory space locations. A segment map (e.g., SM) includes segment map memory locations with the memory space locations in the memory space coupled to respective segment map memory locations in the segment map. The memory space locations in the memory space are allocated to the user profile data by recording in the respective segment map memory locations in the segment map the profile in the plurality of user profiles to which the memory space locations in the memory space are reserved.

One or more embodiments may include partitioning the memory space in segments with a flash page memory granularity (e.g., being multiple of a flash page memory).

In one or more embodiments the segment map memory locations in the segment map may have one byte size.

One or more embodiments may include writing in the memory space locations in the memory space reserved to a certain one of the user profiles only user profile data pertaining to the certain one of the user profiles.

In one or more embodiments the segments of the memory space locations may include respective sets of memory blocks, and the method may include maintaining the allocations of the segments of memory space locations in the memory space to a certain one of the user profiles until all the blocks therein are deleted.

In one or more embodiments the segments of the memory space locations in the memory space may include a respective sets of memory blocks, and the method may include allocating the blocks in one segment of memory locations in the memory space or in a plurality of adjacent segments of memory space locations in the memory space which are either reserved to a certain one of the user profiles or empty.

One or more embodiments may include allocating the memory space locations in the memory space to the user profile data of the plurality of user profiles with avoidance of writes in the segment map as a target (e.g., by minimizing the number of such writes).

One or more embodiments may include identifying in the segment map the memory space locations in the memory space allocated to a certain one of the user profiles to be erased, and performing an erase operation to erase the memory space locations in the memory space thus identified.

An integrated circuit card (e.g., a UICC or eUICC) according to one or more embodiments may include a memory space including memory space locations for storing user profile data of a plurality of user profiles, the memory space partitioned in segments of memory space locations. A segment map includes segment map memory locations with the memory space locations in the memory space coupled to respective segment map memory locations in the segment map. The memory space locations in the memory space are allocatable to the user profile data with the respective segment map memory locations in the segment map recording the profile in the plurality of user profiles to which the memory space locations in the memory space are reserved.

In one or more embodiments apparatus for use according to a plurality of user profiles may include an integrated circuit card according to one or more embodiments.

One or more embodiments may include an operating system configured for managing an integrated circuit card with the method of one or more embodiments.

Apparatus according to one or more embodiments may include a mobile communications apparatus such as a user equipment.

Without prejudice to the underlying principles, the details and embodiments may vary, even significantly, with respect to what has been described by way of example only, without departing from the extent of protection.

The extent of protection is defined by the annexed claims.

What is claimed is:

1. A method, comprising:
    providing an integrated circuit card with a memory space for storing a segment map and for storing user profile data of a plurality of user profiles;
    partitioning the memory space into segments of memory space locations, each segment of memory space locations comprising a respective set of memory blocks;
    partitioning the segment map into segment map memory locations;
    assigning each segment map memory location to a corresponding segment of memory space locations;
    allocating a respective segment to a profile in the plurality of user profiles after a corresponding set of memory blocks of the segment is deleted; and
    reserving one or more segment map memory locations to the profile in the plurality of user profiles, the reserving indicating user profile data permitted to be recorded in the corresponding segment map memory location.

2. The method of claim 1, wherein partitioning the memory space comprises partitioning the memory space in segments with a flash page memory granularity.

3. The method of claim 1, wherein the segment map memory locations in the segment map have one byte size.

4. The method of claim 1, further comprising writing in the memory space locations in the memory space reserved to a certain one of the user profiles only user profile data pertaining to the certain one of the user profiles.

5. The method of claim 1, wherein the segments of the memory space locations in the memory space include respective sets of memory blocks, wherein the method includes allocating the memory blocks in one segment of memory locations in the memory space.

6. The method of claim 1, wherein the method includes allocating the memory blocks in a plurality of adjacent segments of memory space locations in the memory space that are either reserved to a certain one of the user profiles or empty.

7. The method of claim 1, wherein allocating the memory space locations comprises allocating the memory space locations in the memory space to the user profile data of the plurality of user profiles with avoidance of writes in the segment map as a target.

8. The method of claim 1, further comprising:
    identifying in the segment map the memory space locations in the memory space allocated to a certain one of the user profiles to be erased; and
    performing a block erase operation to erase the identified memory space locations in the memory space.

9. The method according to claim 1, wherein the integrated circuit card is managed by an operating system that causes the method to be performed.

10. The method according to claim 9, wherein the operating system is the operating system of a mobile communications apparatus.

11. The method of claim 1, further comprising deleting all memory blocks of a subset of the user profiles in accordance with a single reset operation.

12. An integrated circuit card comprising:
a memory space for storing a segment map and for storing user profile data of a plurality of user profiles, the memory space partitioned into segments of memory space locations, the segment map partitioned into segment map memory locations each segment map memory location assigned to a corresponding segment of memory space location, each segment of memory space locations comprising a respective set of memory blocks, allocating a respective segment to a profile in the plurality of user profiles after a corresponding set of memory blocks of the segment is deleted, one or more of segment map memory locations reserved for the profile in the plurality of user profiles, the reserving indicating user profile data permitted to be recorded in the corresponding memory space location.

13. The integrated circuit card of claim 12, wherein the integrated circuit card is part of an apparatus for use according to a plurality of user profiles.

14. A mobile communications apparatus comprising:
an integrated circuit card with a memory space for storing a segment map and for storing user profile data of a plurality of user profiles;
a processor; and
a non-transitory computer-readable storage medium storing a program to be executed by the processor, the program including instructions for:
partitioning the memory space into segments of memory space locations, each segment of memory space locations comprising a respective set of memory blocks;
partitioning the segment map into segment map memory locations;
assigning each segment map memory location to a corresponding segment of memory space locations;
allocating adjacent segments of memory space locations as being reserved to a respective user profile or empty; and
reserving one or more segment map memory locations to a profile in the plurality of user profiles, the reserving indicating the user profile data permitted to be recorded in the corresponding memory space location.

15. The apparatus of claim 14, wherein the program is part of an operating system of the mobile communications apparatus.

16. The apparatus of claim 14, wherein the integrated circuit card is part of a SIM-on-Chip device.

17. The apparatus of claim 16, wherein the SIM-on-Chip device is soldered to a circuit board of the apparatus using a surface mount technology.

18. The apparatus of claim 14, wherein partitioning the memory space comprises partitioning the memory space in segments with a flash page memory granularity and wherein the segment map memory locations in the segment map have one byte size.

19. The apparatus of claim 14, wherein the program includes further instructions for writing in the memory space locations in the memory space reserved to a certain one of the user profiles only user profile data pertaining to the certain one of the user profiles.

20. The apparatus of claim 14, wherein the program includes further instructions for maintaining the allocations of the segments of memory space locations in the memory space to a certain one of the user profiles until all memory blocks therein are deleted.

21. The apparatus of claim 14, wherein allocating the memory space locations comprises allocating the memory space locations in the memory space to the user profile data of the plurality of user profiles with avoidance of writes in the segment map as a target.

22. The apparatus of claim 14, wherein the program includes further instructions for:
identifying in the segment map the memory space locations in the memory space allocated to a certain one of the user profiles to be erased; and
performing a block erase operation to erase the identified memory space locations in the memory space.

23. The apparatus of claim 14, wherein the program executed by the processor is managed by an operating system of the mobile communications apparatus.

* * * * *